(12) United States Patent
Djakovic et al.

(10) Patent No.: US 10,389,546 B2
(45) Date of Patent: *Aug. 20, 2019

(54) SYSTEMS AND METHODS FOR COMMUNICATION BETWEEN DEVICES AND REMOTE SYSTEMS WITH A POWER CORD

(71) Applicant: iDevices, LLC, Avon, CT (US)

(72) Inventors: Vladan Djakovic, San Francisco, CA (US); Shawn Monteith, Burlington, CT (US)

(73) Assignee: iDevices, LLC, Avon, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/441,974

(22) Filed: Feb. 24, 2017

(65) Prior Publication Data

US 2017/0187544 A1 Jun. 29, 2017

Related U.S. Application Data

(63) Continuation of application No. 14/815,761, filed on Jul. 31, 2015, now Pat. No. 9,596,098.

(Continued)

(51) Int. Cl.
*H04B 7/00* (2006.01)
*H04L 12/28* (2006.01)
(Continued)

(52) U.S. Cl.
CPC .......... *H04L 12/2838* (2013.01); *G08C 17/02* (2013.01); *G08C 19/00* (2013.01);
(Continued)

(58) Field of Classification Search
CPC ..... H04L 12/2838; H04L 67/125; H04B 1/38; H04B 3/03; H04B 3/50; H04W 4/008
See application file for complete search history.

(56) References Cited

U.S. PATENT DOCUMENTS 2,218,830 A 10/1940 Rose et al.
3,324,473 A 6/1967 Fleming
(Continued)

FOREIGN PATENT DOCUMENTS

CN 103928799 A 7/2014
KR 20140083861 A * 7/2014

*Primary Examiner* — Md K Talukder
(74) *Attorney, Agent, or Firm* — Dority & Manning, P.A.

(57) ABSTRACT

Systems and methods for remote control of an electronic device using a power cord are disclosed. A power cord that provides electric power to the device includes a module configured to receive wireless control signals originating from and/or transmit wireless signals to a remote device. The power cord includes one or more control wires for communicating signals between the module and the device. The module may be configured to translate information or signals received from the communications protocol of the remote device to the communications protocol of the device, and vice versa. The control wire(s) may extend along or within the power cord. Methods for wirelessly controlling a device comprise transmitting a command from a remote device to a module connected to the device's power cord, the module wirelessly receiving the command and transmitting the command to the appliance via control wires extending from the module to the device.

26 Claims, 6 Drawing Sheets

Related U.S. Application Data (60) Provisional application No. 61/999,557, filed on Jul. 31, 2014.

(51) Int. Cl.

| | |
|---|---|
| *H04B 3/03* | (2006.01) |
| *H04B 3/50* | (2006.01) |
| *H04W 4/80* | (2018.01) |
| *G08C 17/02* | (2006.01) |
| *G08C 19/00* | (2006.01) |
| *G08C 23/04* | (2006.01) |
| *H04L 12/64* | (2006.01) |
| *H04W 84/12* | (2009.01) |

(52) U.S. Cl.
CPC ............... *G08C 23/04* (2013.01); *H04B 3/03* (2013.01); *H04B 3/50* (2013.01); *H04L 12/6418* (2013.01); *H04W 4/80* (2018.02); *G08C 2201/93* (2013.01); *H04L 2012/285* (2013.01); *H04L 2012/2841* (2013.01); *H04W 84/12* (2013.01)

(56) References Cited

U.S. PATENT DOCUMENTS

| | | | |
|---|---|---|---|
| 3,649,742 A | 3/1972 | Tissot | |
| 5,764,928 A | 6/1998 | Lanctot | |
| 5,786,996 A | 7/1998 | Vitkus et al. | |
| 6,666,712 B1* | 12/2003 | Kramer | G06F 1/266 |
| | | | 439/501 |
| 6,731,201 B1 | 5/2004 | Bailey et al. | |
| 7,399,205 B2 | 7/2008 | McNeely et al. | |
| 8,152,570 B2 | 4/2012 | Kim et al. | |
| 8,170,722 B1* | 5/2012 | Elberbaum | H04L 12/281 |
| | | | 455/151.1 |
| 8,442,792 B1* | 5/2013 | Elberbaum | G06F 19/00 |
| | | | 702/107 |
| 8,949,053 B2 | 2/2015 | Ware | |
| 2002/0022991 A1 | 2/2002 | Sharood et al. | |
| 2002/0085023 A1 | 7/2002 | Zustak et al. | |
| 2003/0067889 A1 | 4/2003 | Petite | |
| 2006/0013415 A1* | 1/2006 | Winchester | G10L 21/0208 |
| | | | 381/110 |
| 2006/0154642 A1* | 7/2006 | Scannell, Jr. | A01G 9/02 |
| | | | 455/404.1 |
| 2007/0220907 A1* | 9/2007 | Ehlers | F25B 49/005 |
| | | | 62/126 |
| 2009/0167494 A1* | 7/2009 | Martins | G01R 21/133 |
| | | | 340/10.1 |
| 2009/0177820 A1 | 7/2009 | Ranade et al. | |
| 2009/0210178 A1 | 8/2009 | Bieganski | |
| 2009/0212628 A1 | 8/2009 | Baarman | |
| 2010/0096925 A1* | 4/2010 | Lee | H02J 13/0075 |
| | | | 307/38 |
| 2011/0156946 A1 | 6/2011 | Lee et al. | |
| 2011/0298538 A1* | 12/2011 | Andrys | H03F 1/0261 |
| | | | 330/127 |
| 2012/0028488 A1* | 2/2012 | Puschnigg | G06F 1/266 |
| | | | 439/189 |
| 2012/0201062 A1* | 8/2012 | Lee | H02J 9/005 |
| | | | 363/84 |
| 2012/0295662 A1* | 11/2012 | Haubrich | H04M 1/72533 |
| | | | 455/556.1 |
| 2012/0302186 A1* | 11/2012 | Jones | H03F 1/0227 |
| | | | 455/127.1 |
| 2013/0082536 A1 | 4/2013 | Taylor et al. | |
| 2013/0207455 A1* | 8/2013 | Doljack | H02J 7/0036 |
| | | | 307/9.1 |
| 2014/0159864 A1* | 6/2014 | Allen | G08C 17/02 |
| | | | 340/5.61 |
| 2014/0235265 A1* | 8/2014 | Slupik | H04W 4/02 |
| | | | 455/456.1 |
| 2014/0266669 A1 | 9/2014 | Fadell et al. | |
| 2015/0084433 A1* | 3/2015 | Shah | H02J 3/24 |
| | | | 307/112 |
| 2015/0145501 A1 | 5/2015 | Ware | |
| 2016/0036395 A1* | 2/2016 | Quaglietta | H03F 1/523 |
| | | | 455/75 |
| 2016/0044447 A1* | 2/2016 | Tetreault | G01K 1/024 |
| | | | 455/41.1 |
| 2016/0112828 A1 | 4/2016 | Williams | |
| 2016/0209899 A1 | 7/2016 | Brantner et al. | |
| 2017/0187544 A1* | 6/2017 | Djakovic | G08C 19/00 |

* cited by examiner

SYSTEMS AND METHODS FOR COMMUNICATION BETWEEN DEVICES AND REMOTE SYSTEMS WITH A POWER CORD

CROSS-REFERENCE TO RELATED APPLICATIONS

This application is a continuation of similarly-titled co-pending U.S. patent application Ser. No. 14/815,761, filed Jul. 31, 2015, which claims benefit under 35 U.S.C. § 119(e) to U.S. Provisional Patent Application No. 61/999,557, filed Jul. 31, 2014, which are incorporated herein by reference in their entireties and made a part hereof.

FIELD OF THE DISCLOSURE

The present disclosure relates generally to communication between remote systems and electrical devices, for example, appliances. More specifically, the present disclosure relates to a system and method for communication between electrical devices and remote systems via an interface that is located within a power cord of the device.

BACKGROUND INFORMATION

Contemporary electrical devices have been equipped with sophisticated control systems that govern the operation of the device. Exemplary such devices include machinery and appliances, such as refrigerators, ranges, dishwashers, laundry machines, air conditioners, fans, and microwave ovens. These devices often have control panels, which may have buttons, dials, touch controls (e.g., touchscreen), and other input/output devices, that enable users to set the desired operation of the device and receive information about the operation, status or condition of the device. In the case of an appliance, for example, this can include information such as temperature or remaining time to complete an operation. Inside the device, these panels are connected via various methods, such as via a communications bus, to microcomputers that control the device. Typically, a set of one or more wires connects the control panel to the microcomputer.

Typically, operation of these control panels requires physical presence of the user at the device. In many cases, though, remote operation of the device would be desirable. For example, remote operation of a laundry machine would enable a user to remotely check the remaining time for clothes to wash or dry. Remote operation of an air conditioner would enable a user to start the air conditioner before returning home.

Such remote operation can be effected in various ways. One method involves some form of radio communication to devices that have connectivity to the public internet. This radio communication can include WiFi connection to a home router, Bluetooth® connection to another Bluetooth device that has internet connectivity, or a cellular or other connection. This radio communication requires use of a radio transceiver to transmit commands between a user and an appliance. The device may include within it a radio transceiver for this purpose.

SUMMARY OF THE INVENTION

The inventors have concluded that current implementation of radio communication to and from devices has limitations and problems. First, locating the transceiver within the device requires extra space or internal redesign of the device. This redesign requirement renders retrofitting of device to include a radio transceiver prohibitively expensive. Second, the device itself can interfere with the operation of the transceiver. For example, the device itself can generate radio signals that cause interference; metal or other panels, housings and components of the device can block radio waves; and the device can generate environmental influences, such as high or low temperature, vibration, etc., that can affect the transceiver's performance. Problems like these have limited deployment of internet-connected devices.

In view of the above, the inventors have determined that there is a need for systems and methods for connecting electric devices, such as appliances, for remote control with reduced redesign requirements.

The present disclosure relates to systems for remote communication with devices, such as appliances, using a module connected to the device's power cord. In one embodiment, a system comprises a power cord equipped with a module having a microprocessor, a transceiver, and an interface with one or more control wires. The module may be placed within a plug enclosure that is connectable to a power source such as an electrical outlet or inline along the power cord. The transceiver is configured to transmit information or commands between a remote device and a microprocessor within the module. The microprocessor translates information and commands from the communications protocol of the remote device to the communications protocol of the device, and vice versa. Control wires extend from the module along or within the power cord, and are operatively connected to the device's control system, e.g., microcomputer. The microprocessor is configured to transmit control signals and/or receive information or feedback from the device's microcomputer using the communications protocol of the device.

The present disclosure also relates to methods for remotely communicating with an electric device, such as an appliance, using a module connected to the device's power cord. In one embodiment, a user transmits commands wirelessly from a remote device to a device via a module attached to a power cord. The module may be placed within a plug or inline along a power cord, and it has a microprocessor, a transceiver, and an interface with one or more control wires. The control wires extend from the module along or within the power cord, and transmit the command(s) the module received from the remote device to the device using the device's communications protocol. In embodiments where the device generates information or feedback, e.g., temperature, time elapsed, or time remaining, and transmits that to the module via the control wires, the module may transmit that information back to the user's remote device via the module's wireless connection, so that the user may monitor the device using the user's remote device.

Other objects and advantages of the present invention will become apparent in view of the following detailed description of embodiments and the accompanying drawings.

BRIEF DESCRIPTION OF THE DRAWINGS

So that those having ordinary skill in the art to which the present disclosure pertains will more readily understand how to make and use the invention, reference may be had to the drawings wherein.

DETAILED DESCRIPTION

Figure 1:
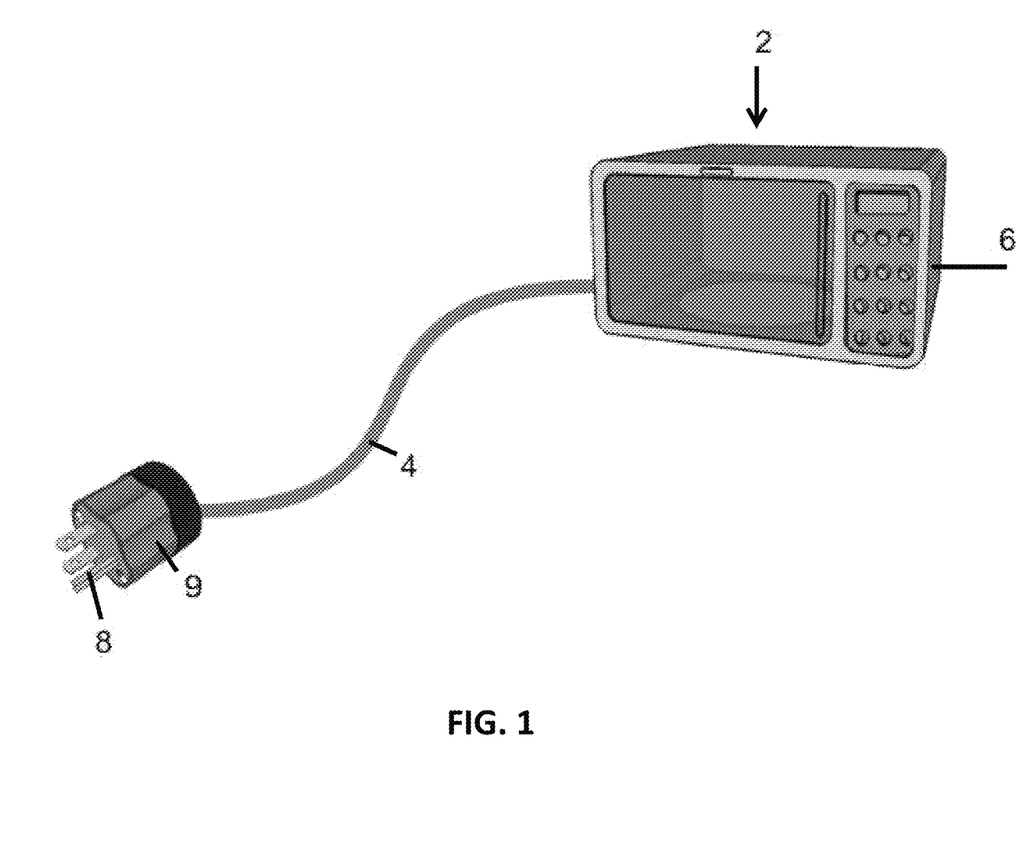
FIG. 1 illustrates a device and power cord.

Referring to FIG. 1, a device 2, which is illustrated as a microwave oven, has a control panel 6 for manual input of controls and/or operation of the device by a user. Although, the device shown is a microwave oven, the present invention can be used in connection with any device currently known or that will become known in the future that has an electronic control system, including machinery, a refrigerator, freezer, range, induction stove, oven, fan, computer, television, air conditioner, humidifier, washing machine, dryer, dishwasher, lighting device, lamp, coffee machine, or food processor. Further, though a control panel 6 is shown, the device 2 may have any other control system for actuation by a user.

The control panel may have buttons, knobs, dials, touchscreens, displays, lights, indicators, and/or other input/output devices that enable users to set the desired operations and receive information about the operation, status or condition of the device 2. This may include, for example, temperature or remaining time to complete an operation. The control panel 6 or other control system may be connected via a communications bus to a microcomputer that controls the device 2.

The device 2 receives electrical power via power cord 4 connected at one end to the device 2. At an opposite end of the power cord, the power cord has a plug assembly 9 with a plug terminal or prong arrangement 8 that protrudes from plug assembly 9 and is adapted to plug into or electrically connect with a power source, e.g., an electrical outlet, in a known manner. It should be understood by those of ordinary skill in the art, however, that an electrical connection other than terminals or prongs may be used to connect to a power source. Any suitable connection to the power source may be utilized.

Figure 2A:
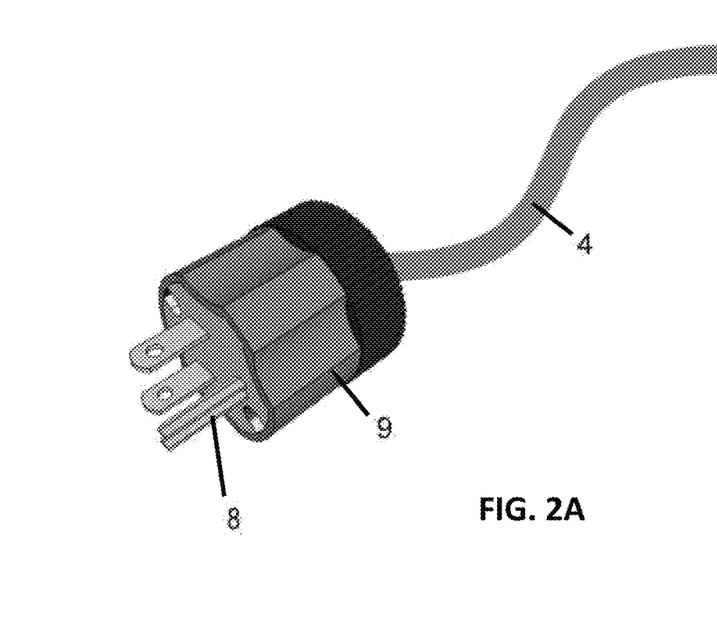
FIG. 2A illustrates a power plug and power cord containing a radio module within the plug.
Figure 2B:
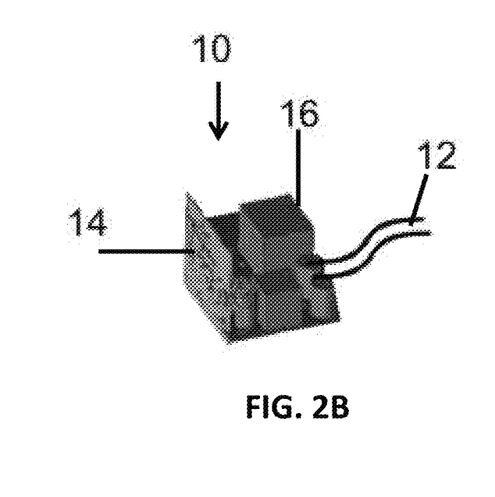
FIG. 2B illustrates a module contained with the power plug illustrated in FIG. 2A.

In the embodiment shown in FIGS. 2A and 2B, a control module 10 is embedded or contained within the plug assembly 9. Components of module 10 include a transceiver 14, a microprocessor 16, and a power converter (not shown in FIG. 2B). Control wires 12 extend from module 10 to the device's control system through the power cord 4. Accordingly, in such embodiments, both the electrical power lines to device 2 and the control wires 12 are compactly contained within the power cord 4. To a user, the power cord 4 may appear no different from a typical power cord. In addition, as may be recognized by one of ordinary skill in the pertinent art based on the teachings herein, any of numerous other internal components currently known, or that later become known, necessary for the integration and proper functioning of the aforementioned internal components may be included within the module.

Transceiver 14 may comprise a radio transmitter and an antenna, or any other suitable device for transmitting and receiving radio or wireless signals as should be appreciated by those of ordinary skill in the art. The antenna may consist of a PCB antenna, a chip antenna, an integrated antenna in the radio IC/module, or any other antenna configured for wireless transmission known to those of skill in the art or later become known. In addition, the transceiver 14 may communicate wirelessly with the remote device using any method of wireless communication that is currently known or may later become known, including but not limited to R-F communication, infrared communication, Bluetooth communication, Bluetooth low energy (BLE), cellular, and Wi-Fi communication.

Microprocessor 16 may include a software storage device and a CPU. The storage device may comprise any suitable, computer-readable storage medium such as disk, non-volatile memory, etc., as will be understood by those of ordinary skill in the art (e.g., read-only memory (ROM), erasable programmable ROM (EPROM), electrically-erasable programmable ROM (EEPROM), flash memory, field-programmable gate array (FPGA), etc.). Software embedded on the storage device may be embodied as computer-readable program code and executed by the CPU using any suitable high or low level computing language as would be understood by those of ordinary skill in the art, such as, but not limited to, Python, Java, C, C++, C#, .NET, MATLAB, etc. The CPU may include any suitable single- or multiple-core microprocessor 16 of any suitable architecture that is capable of implementing and running a control protocol for the device 2 (e.g., Intel processor). That is, the microprocessor 16 is configured to generate and send signals to the device 2, in accordance with software contained in the computer-readable storage medium of the module 10, so that the device 2 can receive signals from the module 10 and implement to operate the device 2.

A power converter (not shown in FIG. 2B) is electrically connected to electrical power wires (not shown in FIG. 2B) within the power cord that receive electrical power from an electric power source, e.g., electrical prongs 8 that are electrically connected to the power source, such as an outlet. The power converter converts voltage from the power line into a voltage that is suitable for use by module 10. This includes the power used to operate the components of the module 10 itself, but also to generate signals for transmission to the device 2 along the control lines 12, and radio/wireless signals for communication with the user's remote device.

The microprocessor communicates with the microcomputer of the device 2 via the control wires 12. In the embodiment of FIGS. 2A and 2B, the plurality of control wires 12 are embedded within the power cord 4 alongside the power lines (not shown in FIG. 2A) that provide electrical power to the device. In such embodiments the physical appearance or envelope of the power cord is not affected, as the system is fully embedded inside the device's power cord. In other embodiments, the control wires 12 operatively connect to the device 2 separately from the power cord 4.

In the embodiments shown, two control wires 12 are depicted. However, as should be realized by one of skill in the art, the system may contain any suitable number of wires, e.g., one wire for bi-directional communication between the module and the device, or additional wires, such as four, six, eight, or more, according to the requirements of the communications bus of the device. For example, a USB connection typically comprises four wires. When the device's control panel communicates with its microcomputer via a USB connection with four wires, the plurality of control wires 12 may likewise comprise a USB connection with four wires. As one of ordinary skill in the art may appreciate, the communication link between the module 10 and device 2 may be of any suitable configuration, e.g., USB, serial, parallel, optical (e.g., fiber optic), etc.

The control wires 12 are operatively connected to the device's communications bus, either directly or indirectly. The communications bus then transmits commands and information between the control wires and the device's microcomputer (e.g., from/to the module 10). In this manner, the device 2 responds to signals from control wires 12 (which are from the module 10) essentially the same way as it would to signals from the device's control panel 6 manually entered from a user.

An advantage of the invention over previously-known devices is that, due to the relatively easy installation and connection of the control wires to the device, i.e., they operatively connect to/through the device's communications bus, only limited modification to the device need be made. For example, the device does not have to be configured or re-configured to incorporate a wireless device. Moreover, the disadvantages discussed above with integrated wireless control devices are effectively avoided. In addition, the cost of providing the power cord is much less than integrating the wireless unit into the device itself. On this point, the power cords can be standardized for use with many different types of device, providing high cost efficiency. This is in contrast to the previously-known devices, where each device would need to be configured separately.

A further advantage of this embodiment is that the device can operate using the same control protocol with which it was initially programmed. As discussed above, the microprocessor 16 may be programmed to communicate with the device's microcomputer using the communications protocol of the device. The microprocessor 16 may be additionally programmed to translate information from the communications protocol used by the device to the communications protocol used by a remote device. This permits, for example, not only transmitting commands to the device, but receiving information, feedback or status information from the appliance and communicating that to the remote device. It should be understood that, depending on the degree of variation among devices, it may be necessary to program the microprocessor 16 with a unique program for each device model, or each category of device, that is to be remotely connected or accessed using the module. However, as the same hardware, i.e., the power cord, may be used for multiple devices, this involves relatively low cost software programming, not hardware modification of the device itself.

Figure 3A:
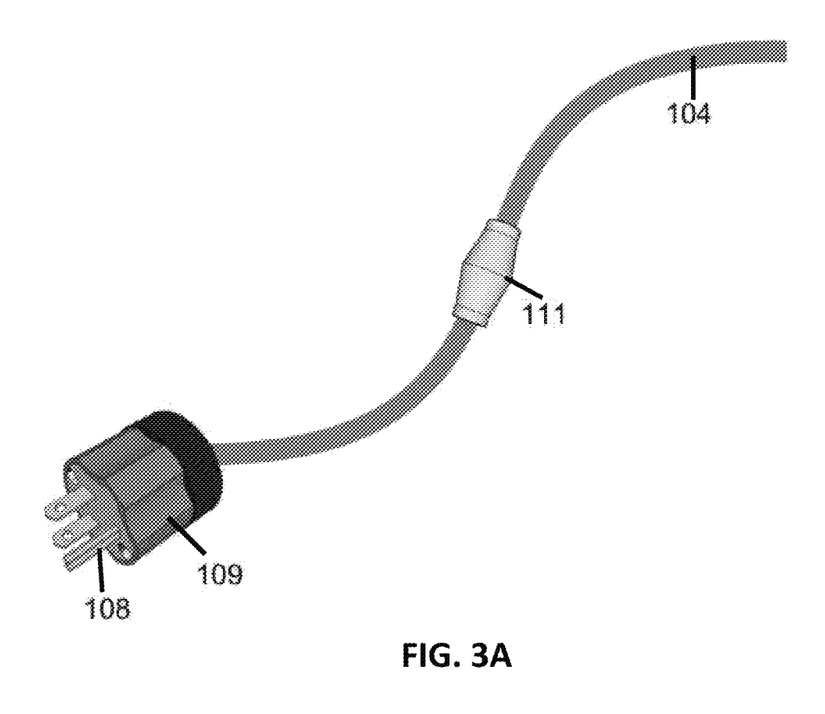
FIG. 3A illustrates a power plug and power cord containing a radio module within the power cord.
Figure 3B:
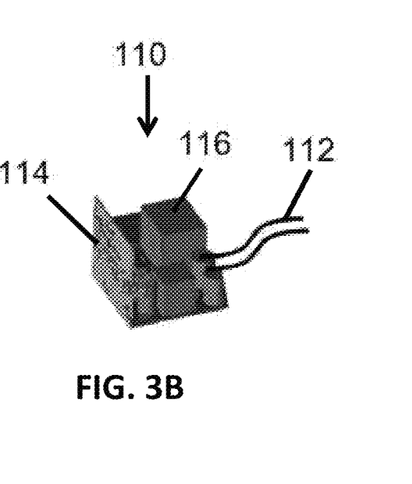
FIG. 3B illustrates a module contained with the power plug illustrated in FIG. 3A.
Figure 4:
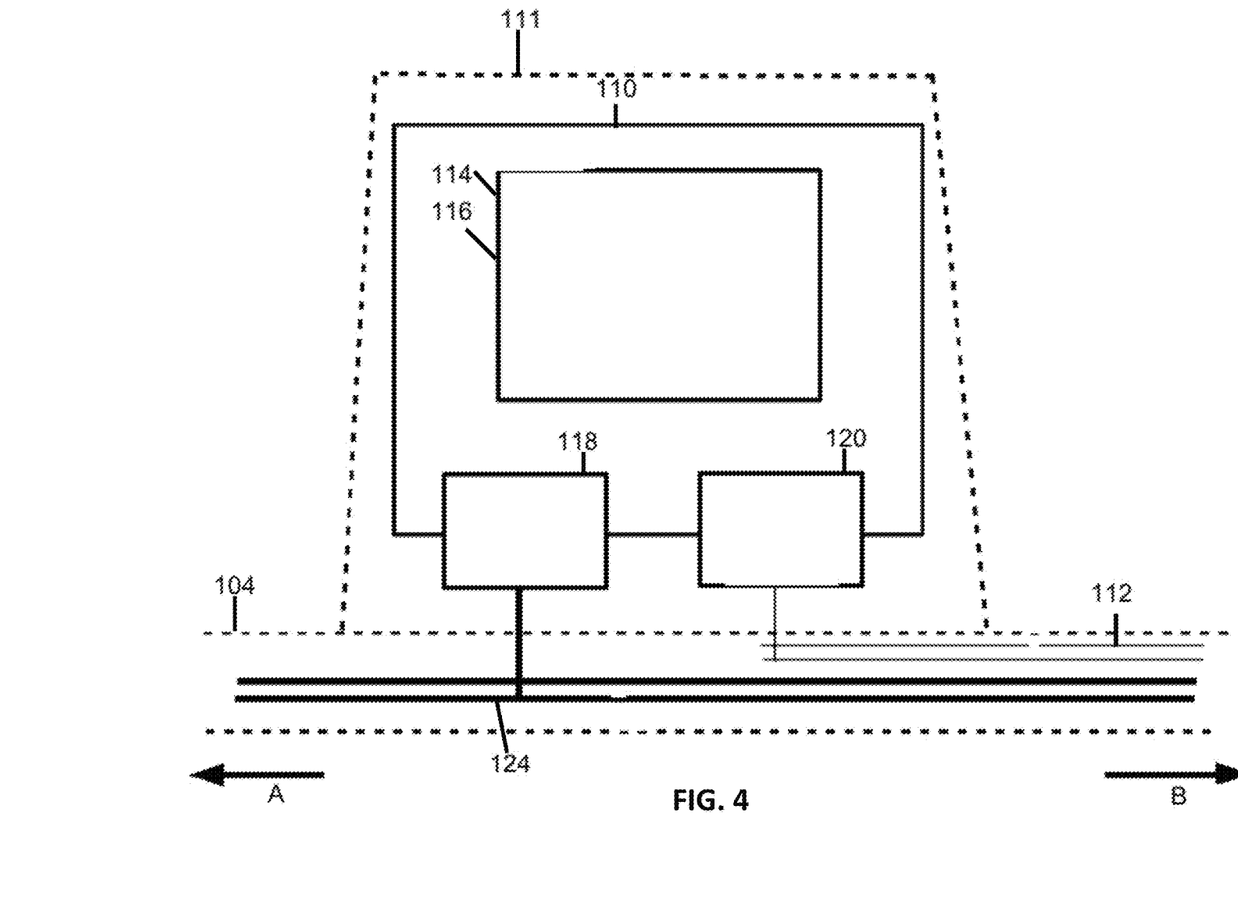
FIG. 4 is a schematic diagram of internal components of the module and power cord illustrated in FIGS. 3A and 3B.

In another embodiment shown in FIGS. 3A, 3B, and 4, a module 110, which may be structurally and/or functionally similar to module 10, is placed inline along a portion of power cord 4. Module 110 may comprise the same internal components as the module 10 of the embodiment of FIGS. 2A, and 2B, including power wires 112, transceiver 114, microprocessor 116, and power converter 118 (not shown in FIG. 3B). As noted above, the primary difference between the embodiment of FIGS. 2A and 2B and the embodiment of FIGS. 3A, 3B, and 4 is the location of the module 110 being inline along the power cord 104, rather than embedded within the plug assembly 109. Further to this difference, module 110 is encased in sleeve or housing 111 that extends around the portion of power cord 104 to which module 110 is operatively connected. The inline module 110 is shown in FIG. 3A located near the plug assembly of the power cord. This placement provides distance between the transceiver module 110 from any radio and environmental interferences from the device itself. However, the module 110 may be placed at any suitable location along the power cord 104.

FIG. 4 is a schematic diagram illustrating internal components of module 110, according to one embodiment. Power cord 104 extends in direction "A" toward power plug assembly 109 (not shown in FIG. 4), to which it is electrically connected, and contains power wires 124. Power converter 118 is electrically connected to power wires 124 and converts the line voltage into voltage suitable for operation of the transceiver 114 and microprocessor 116, as discussed above. The microprocessor is operatively connected to wired control interface 120, which is in turn operatively attached to control wires 112. Sleeve or housing 111 extends around module 110. In the embodiment depicted in FIG. 4, the control wires 112 are encased within power cord 104 alongside power wires 124, and the power cord 104 extends in direction "B" from module 110 toward device 2 (not shown in FIG. 4). In an alternative embodiment, the control wires 112 may extend to the device in a separate cord. As would be understood by one of skill in the art, the schematic relationship of the elements of the module 110 shown in FIG. 4 may be applicable in all pertinent respects to the embodiment depicted in FIGS. 2A and 2B, except that in that embodiment the plug assembly 9 encases the module 10 instead of a sleeve or housing 111 on the power cord 104.

Figure 5:
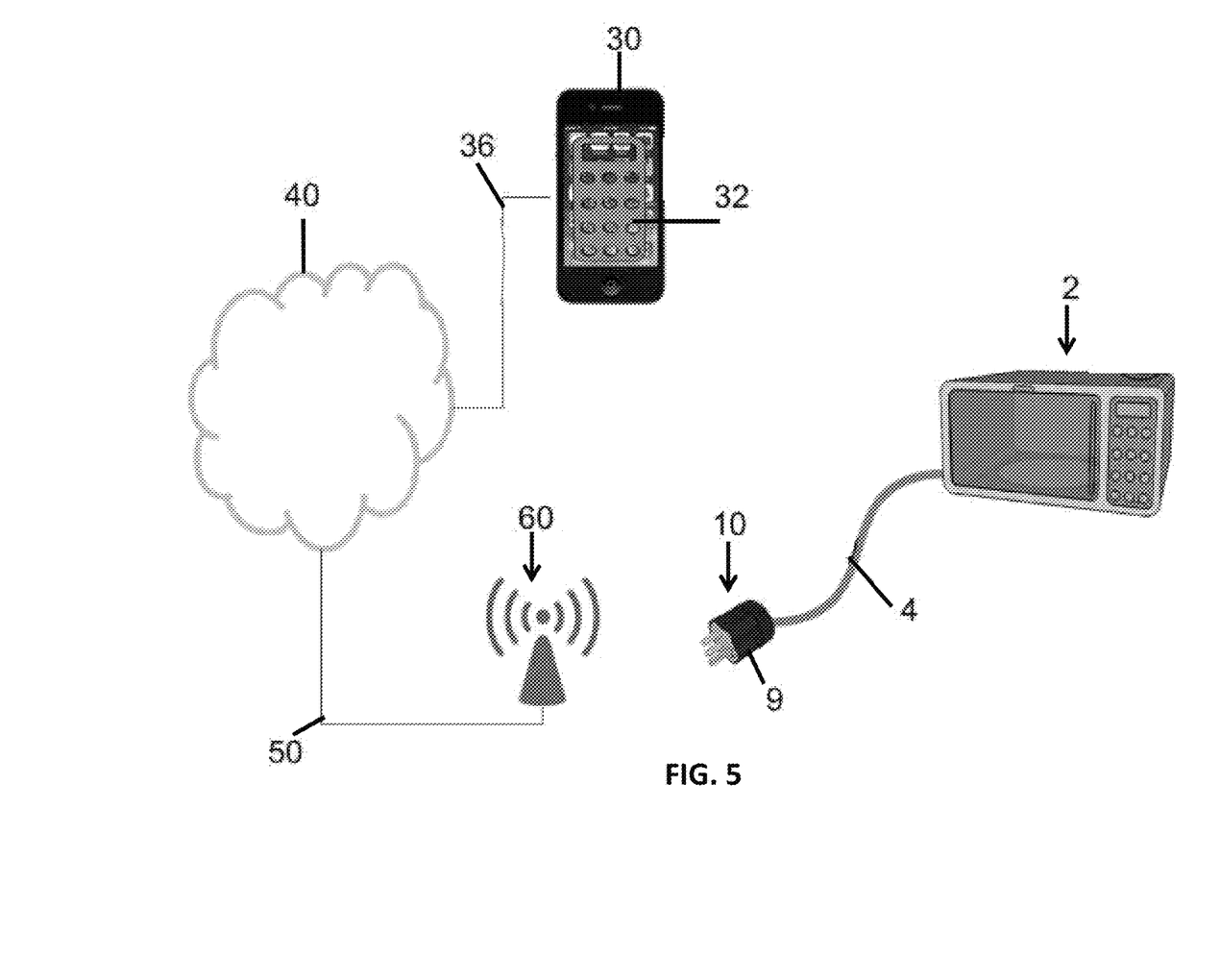
FIG. 5 is a schematic illustration of a system wherein a device and a remote device communicate via a power cord.

FIG. 5 schematically illustrates a system for communication between a device 2 and a remote device 30. In this illustrated embodiment, the remote device 30 includes a computer program, e.g., an application, for interface between the user and the system to communicate with the device 2. An exemplary application on the remote device 30 may display, for example, a graphical user interface 32 that simulates the device control panel. The remote device 30 used to control the device 2 may be any suitable computerized device, e.g., a smart phone, a tablet, a mobile computer, a desktop computer, etc. The remote device 30 is operatively connected to the device 2 through a communication path. In the illustrated embodiment, this path includes an internet service provider (represented by communication lines 36), public Internet (represented by cloud 40), an internet service provider (represented by communication lines 50), which may be the same or different than internet service provider 36, an access point for the module 10 of the power cord 4 (represented by radio beacon 60), the radio transceiver module 10 which, in this embodiment, is located inside the plug assembly 9, and additional control wires 12 inside the cable 4. The user can now access all or some of the functions of the device control panel 6 from the remote location.

It should be understood that the communication between the remote device 30 and the cloud 40, and between the cloud 40 and the access point 60 may occur over any known or later known communication system. This includes, but is not limited to, wired systems, wireless systems, cellular systems, Ethernet systems, etc. It should also be understood that, though in the embodiment of FIG. 5 the user interface 32 has a similar form as the control panel 6 on the device, the interface 32 may take any suitable form that allows a user to input control instructions into the interface 32 to control the device 2, and/or perceive information transmitted from the device 2 to the remote device 30. It should also be understood that, though the interface 32 in the embodiment shown in FIG. 5 is in the form of a graphical/visual interface, the interface 32 may take any suitable form. For example, in alternative or additionally to graphical/visual elements, the interface 32 may include audio and/or tactile (e.g., vibration, movement, etc.) elements. The interface 32 may also include motion or gesturing detection, such that, for example, the interface 32 may recognize gestures or movement of the user representing control instructions of the user. As one such example, if the control panel 6 contained a dial for controlling operation of the device 2, the interface 32 could be programmed to recognize a motion of the user representing the virtual turning of a dial. Those of ordinary skill in the art should understand how to create or program the interface 32 to achieve the desired control and display features of the interface 32.

An exemplary method of using the system illustrated in FIG. 5 is as follows. For example, to transfer a command from the remote device 30 to a device 2, which in the illustrated embodiment is an appliance, e.g., a microwave oven, a user inputs a command onto the remote device 30 via the interface 32. This command may then be transferred to the transceiver 16. In the illustrated embodiment, this is done via a series of intermediate way points, including the cloud 40, one or more internet service providers 36, 50, and the access point 60. The access point 60 then transmits the command to the transceiver 16 within module 10, for example, by radio communication. This command is further transmitted along control wires 12 to device 2 by the module 10 in accordance with its programming. Information may be transferred back from the device 2 to the remote interface 32 along the same communications path, in the opposite direction.

It should be noted, though, that the communication path between the device 2 and the remote device 30 may be any type of known or later known communication system or combination of systems. For example, the remote device 30 and the module 10 may communicate directly with each other. One protocol to accomplish this includes Bluetooth or BLE communication between the two, in embodiments where the module 10 and the remote device 30 are so equipped. In other embodiments, the remote device 30 and the module 10 may communicate through a network at the location of the device 2 and the remote device 30, for example, a Wi-Fi network. In such embodiments, the public internet need not be utilized, though in other embodiments the cloud 40 may be used in the communication path even if the device 2 and the remote device 30 are located within the same local network. Such embodiments permit, for example, remote (cloud) storage of the commands and information transmitted between the device 2 and the remote device 30, which may then, in various embodiments, be later retrieved, e.g., by the remote device 30 or another computing device.

It should also be understood that while the embodiment shown in FIG. 5 depicts one device 2 and one remote device 30, the system may include multiple devices and multiple remote devices that may communicate with each other. As one example, the remote device 30 may control and receive information about multiple devices, which may be the same or different from each other. As another example, one or more devices may be controlled by and/or send information to multiple remote devices.

Figure 6:
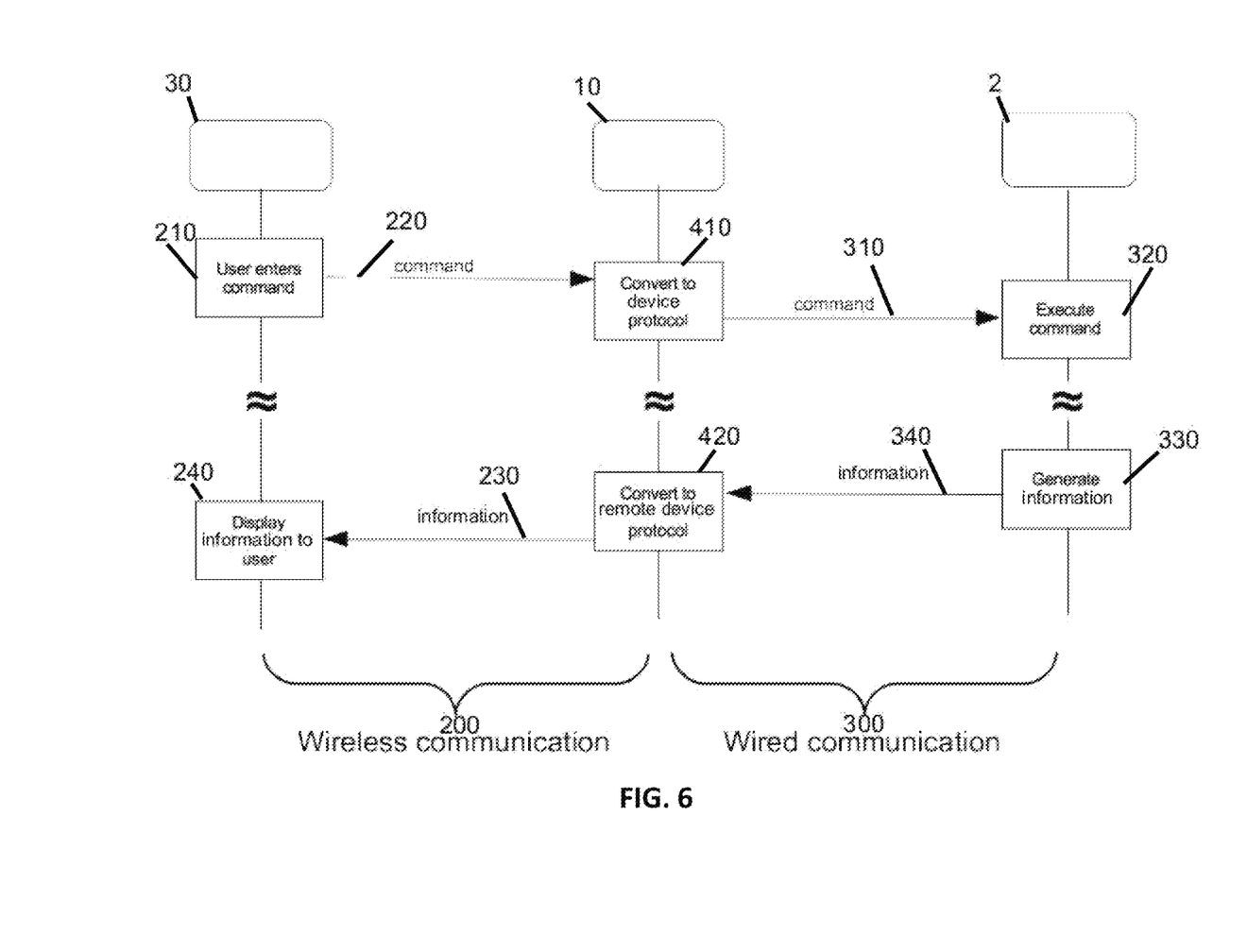
FIG. 6 is a schematic diagram of a control loop between a remote device, a radio module, and a device.

FIG. 6 schematically depicts a control/feedback loop between a remote device 30, a module 10, and a device 2. Module 10 mediates between wireless communication position 200 of the loop including remote device 30 and the wired communication position 300 of the loop including device 2. In one embodiment of a control loop, a user may enter at step 210 a command on a remote device 30. The remote device 30 transmits at step 220 the command directly or indirectly to the module 10, using a suitable form of wireless communication, as discussed above. The microprocessor of module 10 translates, if necessary, at step 410 the command received from remote device 30 into a communications protocol understood by device 2. Module 10 then transmits at step 310 the command via wired communication to device 2. Device 2 at step 320 executes the command. Device 2 may at step 330 generate information, e.g., following execution of the command. Alternatively, the device 2 may generate and transmit information without relation to a command signal received from the module 10. Device 2 transmits this information at step 340 using wired communication to module 10. The microprocessor of module 10 if necessary translates at step 420 this information to a protocol understood by the remote device 30. Module 10 then transmits at step 230 the information using wireless communication to the remote device 30. The remote device 30 then displays at step 240 the information to a user. The user may then respond to the information by transmitting another command to the device. As can be appreciated, while FIG. 6 depicts steps 210, 220, 410, 310, 320, 330, 340, 420, 230, and 240 as occurring in a control or feedback loop, each step or series of steps can be performed without necessarily being preceded or followed by performance of the other steps. For example, the device may transmit information to the user without being prompted by a user command.

While the above describes certain embodiments, those skilled in the art should understand that the foregoing description is not intended to limit the spirit or scope of the invention. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A system for remotely communicating with a device, the system comprising:
   a power cord having a power line therein configured to provide the device with electrical power from an electrical source;
   a module electrically connected to the power line, the module having a transceiver for wirelessly communicating with a remote device, a microprocessor, and a power converter configured for converting power in the power line for use by the module;
   wherein the device comprises a microcomputer separate from the microprocessor and configured to control the device, the device further comprising a control panel and a communication bus modulating between the control panel and the microcomputer; and
   the power cord extending between the module and the device, the power cord further includes at least one control wire embedded in the power cord extending from the module to the device and configured to transmit control signals between the module and the device to control the device,
   wherein the at least one control wire is connected to the communication bus at substantially the same location at which the control panel is connected to the communication bus.

2. A system as defined in claim 1, wherein the microcomputer is configured to transmit and receive communications according to a device communications protocol, and the module communicates with the microcomputer using the device communications protocol.

3. A system as defined in claim 2, wherein the microprocessor further comprises a software storage device, and computer readable instructions enabling the module to communicate with the device using the device communications protocol are electronically stored on the software storage device.

4. A system as defined in claim 1, wherein a plug assembly is attached to an end of the power cord, and the module is embedded within the plug assembly.

5. A system as defined in claim 1, wherein a plug assembly is attached to an end of the power cord, and the module is operatively connected to a portion of the power cord located between the plug assembly and the device.

6. A system as defined in claim 5, wherein the module is enclosed by a housing or sleeve.

7. A system as defined in claim 1, wherein the at least one control wire is at least partially enclosed within a portion of the power cord that extends between the module and the device.

8. A system as defined in claim 1, wherein the power cord defines a first end that is proximate to the device and a second end that is distal to the device, and the module is located at or near the second end of the power cord.

9. A system as defined in claim 1, wherein the device is an appliance.

10. A system as defined in claim 9, wherein the appliance is a washing machine, dryer, air conditioner, fan, humidifier, microwave, refrigerator, or freezer.

11. A system as defined in claim 1, wherein the transceiver communicates with the remote device using at least one of R-F, infrared, Bluetooth, Bluetooth low energy, or Wi-Fi communication protocol.

12. A system as defined in claim 1, wherein the power converter is configured to convert a voltage in the power line to a voltage suitable for operation of the module.

13. A system as defined in claim 1, wherein the at least one control wire is for delivery of commands to the microcomputer.

14. A system as defined in claim 1, wherein the signals transmitted between the module and the device are control signals not for turning the device on or off.

15. A system as defined in claim 1, wherein the signals transmitted between the module and the device are control signals that control the operation of the device.

16. A system as defined in claim 1, wherein the signals transmitted between the module and the device comprise control signals comprising information on temperature or remaining time to complete an operation on the device.

17. A system as defined in claim 1, wherein the at least one control wire is located within an envelope of the power cord or extends alongside the power line along at least a substantial portion of a length of the at least one control wire.

18. A method for remotely communicating with a device, the method comprising:
wirelessly transmitting information between a remote device and a module located on and operatively attached to a power cord of the device, the module having a transceiver, microprocessor, and power converter, the device comprising a microcomputer separate from the microprocessor and configured to control the device, the device further comprising a control panel and a communication bus modulating between the control panel and the microcomputer; and
transmitting the information to control the device via wired communication along at least one control wire of the power cord, the at least one control wire embedded in the power cord extending from the module to the device, the at least one control wire connected to the communication bus at substantially the same location at which the control panel is connected to the communication bus.

19. A method as defined in claim 18, wherein the information is a command signal configured to control operation of the device.

20. A method as defined in claim 18, further comprising receiving information or feedback from the device, the receiving step comprising at least one of:
(i) receiving information or feedback from the device to the module via wired communication along the at least one control wire, and
(ii) receiving information or feedback from the module to the remote device via wireless communication.

21. A method as defined in claim 20, further comprising, prior to step (ii), translating the information from a communications protocol used by the device to a communications protocol used by the remote device.

22. A method as defined in claim 18, wherein the wirelessly transmitting step is performed by an application stored on the remote device.

23. A method as defined in claim 22, wherein the application comprises a graphical user interface configured to simulate a control panel of the device.

24. A method as defined in claim 18, wherein the wirelessly transmitting step is performed utilizing at least one of infrared, Bluetooth, Bluetooth low energy, and Wi-Fi communication protocol.

25. A method as defined in claim 18, wherein the at least one control wire is for delivery of commands to the microcomputer.

26. A method as defined in claim 23, wherein engagement of an element of the graphical user interface causes commands and feedback to be transmitted between the control wire and the microcomputer that comprises signals identical to those which are configured to be transmitted between the control panel and the microcomputer when a corresponding element is engaged on the control panel.

* * * * *